United States Patent
Saitoh et al.

(10) Patent No.: US 6,821,477 B2
(45) Date of Patent: Nov. 23, 2004

(54) METHOD OF PRODUCING COPPER-BASE SINTERED BEARING MATERIAL

(75) Inventors: Yasushi Saitoh, Inuyama (JP); Takayuki Shibayama, Inuyama (JP)

(73) Assignee: Daido Metal Co., Ltd., Nagoya (JP)

( * ) Notice: Subject to any disclaimer, the term of this patent is extended or adjusted under 35 U.S.C. 154(b) by 22 days.

(21) Appl. No.: 10/357,788

(22) Filed: Feb. 4, 2003

(65) Prior Publication Data

US 2003/0175143 A1 Sep. 18, 2003

(30) Foreign Application Priority Data

Mar. 12, 2002 (JP) .................................... 2002-066897

(51) Int. Cl.$^7$ ................................................. B22F 7/04
(52) U.S. Cl. ..................................................... 419/9
(58) Field of Search ........................................ 419/2, 9

(56) References Cited

U.S. PATENT DOCUMENTS 6,183,689 B1 * 2/2001 Roy et al. ..................... 419/38
6,184,689 B1 * 2/2001 Shipley ........................ 324/527

* cited by examiner

*Primary Examiner*—Daniel Jenkins
(74) *Attorney, Agent, or Firm*—Rader, Fishman & Grauer PLLC

(57) ABSTRACT

A method of producing a copper-base sintered bearing material is provided so that it is sintered with high thermal efficiency. As a heat source for a sintering furnace, an electric resistance heater which heats a furnace atmosphere and/or a high frequency induction heater, is provided, and also a microwave oscillating device which irradiates microwaves to copper alloy powder to be sintered is provided therewith. A steel sheet, which is a steel backing metal, can be heated by an electric resistance heater and/or a high frequency induction heater, and the copper alloy powder can be heated directly by microwaves.

4 Claims, 1 Drawing Sheet

METHOD OF PRODUCING COPPER-BASE SINTERED BEARING MATERIAL

CROSS-REFERENCE TO RELATED APPLICATIONS

This application claims priority based on Japanese Application No. 2002-066897, filed Mar. 12, 2002.

FIELD OF THE INVENTION

The present invention relates to a method of producing a copper-base sintered bearing material and, more particularly, to a method in which sintering powder is heated by a microwave oscillating device in a sintering furnace.

BACKGROUND OF THE INVENTION

As a copper-base plain bearing material used for internal combustion engines, industrial machines, or the like, the material which is produced by scattering copper alloy powder on a steel backing metal and by sintering it has generally been used. The procedure for producing this copper-base sintered bearing material is as described below. First, copper alloy powder is scattered on a steel strip and this material is caused to pass through a sintering furnace which is heated to a high temperature by an electric resistance heater. In the sintering furnace, the copper alloy powder is heated and sintered in a reducing atmosphere. Next, the material is rolled to densify the sintered layer, and succeedingly is subjected to re-sintering by a sintering furnace and rolling. Finally, heat treatment is performed as necessary.

In the above-described producing method, the temperature of material changes as follows: Although the copper alloy powder is scattered at room temperature, subsequently in the sintering furnace, the temperature reaches a sintering temperature (about 750 to 950° C. depending on the composition) in about 10 to 30 minutes, and the material is kept at that temperature for about two minutes to be sintered. Subsequently, the material goes from the sintering furnace to a cooling zone, where it is cooled for 5 to 15 minutes, so that the temperature of material decreases to room temperature.

As described above, in the sintering furnace, the material is heated to the sintering temperature in a short time, and is kept at the sintering temperature for a fixed time to be sintered. Therefore, the sintering furnace must have a high internal volume to prevent the furnace temperature from decreasing even if the copper alloy powder and the steel strip which are charged at room temperature absorb heat.

However, if the internal volume of sintering furnace is increased, the furnace wall area increases accordingly, so that much heat dissipates to the outside. Further, the volume of refractories constituting the furnace body increases, so that the quantity of heat for heating the refractories to a high temperature also increases. In particular, in a producing system in which the operation is stopped periodically, each time the producing work is started, the whole of sintering furnace must be heated from ordinary temperature, and the start-up time is long. As described above, the conventional sintering furnace produces a high heat loss, so that it is uneconomical.

SUMMARY OF THE INVENTION

The present invention has been achieved in view of the above situation, and accordingly an object thereof is to provide a method of producing a copper-base sintered bearing material, in which heat loss can be reduced to the utmost.

According to present invention, there is provided a method of producing a copper-base sintered bearing material, in which unpressurized copper or copper alloy powder or a green compact of copper or copper alloy powder is sintered in a sintering furnace, wherein a microwave oscillating device is used as heating means provided in the sintering furnace, and the copper or copper alloy powder is heated and sintered by the microwave oscillating device.

In the present invention, the method of producing it can be configured so that copper or copper alloy powder is scattered on a steel sheet, and subsequently the copper or copper alloy powder on the steel sheet is heated and sintered by the microwave oscillating device in a sintering furnace.

Also, the sintering furnace can be provided with an electric resistance heater and/or a high frequency induction heater as heating means in addition to the microwave oscillating device so that both of the microwave oscillating device and the electric resistance heater and/or the high frequency induction heater can be used. Further, the interior of the sintering furnace can be made in a reducing atmosphere or an inert gas atmosphere.

The circumstances before the present invention have been made are as follows.

(1) Conventional Concept of Microwave Heating of Metal

Conventionally, microwave heating has widely been applied to a dielectric substance (a substance that does not pass an electric current or that is difficult to pass an electric current). However, microwave heating has not been applied to heating of a conductive material such as a metal. This is based on that the mechanism of heating of a dielectric substance by microwaves is thought that the dipole of dielectric substance is oscillated by a change in electric field (intrusion of microwaves into a substance), heat is generated by the friction, and the dielectric substance is heated uniformly from the interior thereof, but in a conductive material such as a metal, the microwaves penetrate only a very thin surface portion, so that the dielectric substance has been thought to be unable to be heated.

(2) Microwave Heating of Bronze Powder Filled Into Alumina Boat

Although it had been thought that microwave heating of metal was unable to be performed as described above, the inventor tried sintering bronze powder (Cu—Sn alloy) by means of microwave heating to solve the above-described conventional problem of poor thermal efficiency of heating furnace. Microwave heating was performed to heat bronze powder, which was a specimen, filled into an alumina boat in an unpressurized state by using microwave heating batch furnace (output: 8 KW) having a general microwave oscillating device with a frequency of 2.45 GHz, which had been used for sintering of ceramics etc. As a result, although the temperatures of the boat and bronze powder were room temperature at first, the temperatures increased rapidly along with the start of microwave heating and reached to 800° C. within about 10 minutes, by which bronze powder could be sintered. When heating by microwaves was further continued from this temperature, the temperature of specimen further increased, and shortly the specimen melted.

The internal volume of the batch furnace used for this test was about 1 m3. For the ordinary furnace that uses an electric resistance heater as a heat source, since heat is taken away by the atmosphere and furnace wall at the early stage of heating start, rapid heating such that temperature is increased to 800° C. within about 10 minutes cannot be performed by any possibility.

(3) Microwave Heating of Alumina Boat Only

The result of the above-described test means that bronze powder can be heated by microwaves. However, the alumina boat used as a holding vessel for bronze powder is formed of a dielectric substance, that is, a substance that absorbs microwaves and generates heat. Therefore, it was thought that the rapid temperature rise of bronze powder is possibly caused by heat conduction from the alumina boat.

To solve this problem, the alumina boat was, singly heated (with no bronze powder being filled) by microwaves, and resultantly it was found that the temperature of alumina boat did not increase rapidly unlike the bronze powder. From this fact, it was found that rapid heating of bronze powder was not caused by heat conduction from the alumina boat.

From the above result, it was found that the temperature of bronze powder, which is a metal that has conventionally been thought to be unable to be heated by microwaves, reaches to the sintering temperature in a short time by means of microwaves, and hence a sintered material can be obtained.

(4) Microwave Heating in a State Wherein Bronze Powder is Scattered on Steel Sheet To check whether the application to the production of a copper-base sintered bearing material in which copper alloy is sintered on a steel backing metal, which has been used widely as a bearing for internal combustion engines, industrial machines, or the like, is appropriate or not, only a steel sheet was first heated by the same microwave heating batch furnace, and the result was that the temperature of steel sheet scarcely increased. However, when microwave heating was performed in a state wherein bronze powder was scattered on a steel sheet, the bronze powder could be heated sufficiently to the sintering temperature and sintered, and could be bonded to the steel sheet although long time for rising temperature was required as compared with the case where bronze powder was filled into an alumina boat.

(5) Reason why Bronze Powder can be Heated by Microwaves

The present inventor presumed the cause for the above phenomenon as described below. The top surface of metal is covered with an oxide film, and this oxide film is a dielectric substance. Therefore, microwaves penetrate the oxide film on the metal surface, and this portion is heated microscopically. However, the heat generated in this oxide film is taken away by a metal portion having high heat conductivity which is covered by the atmosphere and the oxide film, so that it seems that heating does not occur macroscopically. If the metal is of a thin and flat shape as in the case of a steel sheet, the volume of oxide film with respect to the total volume is low, so that heating cannot be performed.

Contrarily, fine powder such as bronze powder has a far larger surface area with respect to the volume than that of a plate-shaped metal, so that the volume of oxide film with respect to the total volume is high. Therefore, the heating value is high, so that heating seems to occur macroscopically too.

In microwave heating in the state in which bronze powder is scattered on a steel sheet, the oxide film on the surface of bronze powder is heated. However, it is thought that since the heating is performed in a state in which the heat is transferred to the steel sheet and is taken away continuously, the temperature rise takes much time as compared with the case where bronze powder is held in an alumina boat.

(6) Test Using Both Microwave Oscillating Device and Electric Resistance Heater and/or High Frequency Induction Heater Further, the present inventor conducted a sintering test by using both a microwave oscillating device and an electric resistance heater and/or a high frequency induction heater so that the bronze powder and steel sheet can be heated to the sintering temperature in a shorter time. This test using both of the microwave oscillating device and the electric resistance heater and/or the high frequency induction heater was conducted in a reducing atmosphere and an inert gas atmosphere.

(6-1) Reducing Atmosphere

In the case where both of the microwave oscillating device and the electric resistance heater and/or the high frequency induction heater are used, if the atmosphere is a reducing one in any combination, the percentage of shrinkage of bronze powder is high (some of bronze powder melts) as compared with the case where sintering is performed by the electric resistance heater only. To obtain a percentage of shrinkage equal to that in the case where sintering is performed by the electric resistance heater only, the output of the electric resistance heater must be decreased, or the sintering speed must be increased considerably (residence time in furnace must be shortened).

(6-2) Inert Gas Atmosphere

Sintering of metal powder in an inert gas atmosphere has been applied to sintering of a preformed green compact. However, in sintering in an unpressurized state as in the case where copper alloy powder is scattered on a steel sheet as in producing a copper-base sintered bearing material with a steel backing metal, the sintering in an inert gas atmosphere is not applied because sintering is difficult to perform. The reason why sintering is difficult to perform is that an oxide film exists on the surface of powder, and also because of the unpressurized state, powders are scarcely brought into contact to each other, and hence the diffusion of metal element is difficult to occur. In this experiment as well, the bronze powder had as low a percentage of shrinkage as being sintered slightly.

However, if both of the microwave oscillating device and the electric resistance heater and/or the high frequency induction heater are used, in an inert gas atmosphere, sintering occurred in a far shorter time than in a reducing atmosphere.

(6-3) Effect of Combined Use

From the result of sintering test in which both of the microwave oscillating device and the electric resistance heater and/or the high frequency induction heater are used, it was found that the combined use can accelerate sintering or can reduce the output required for heating as compared with the conventional sintering operation using the electric resistance heating device only, so that the method using both of the microwave oscillating device and the electric resistance heater and/or the high frequency induction heater is economical. Further, it was found that the sintering of bronze in an unpressurized state in an inert gas atmosphere, which has been difficult to perform by electric resistance heating only, can be performed.

(6-4) Estimation of Effect of Combined Use

The inventor estimated the effect of the combined use as described below. When only the microwave oscillating device is used, even if bronze powder is heated by microwaves, the heat is taken away by a steel sheet having a low temperature, so that the heating rate decreases. When the electric resistance heater is used together with the microwave oscillating device, however, the steel sheet is heated by the electric resistance heater, so that the heat of bronze powder is less liable to be taken away, and further the temperatures of the interior of furnace and the furnace wall are increased. Therefore, heating is accelerated as compared with the case where the microwave oscillating device is singly used.

Also, when the high frequency induction heater is used together with the microwave oscillating device, the steel sheet is heated rapidly by the high frequency induction heater. Therefore, the heat of bronze powder is not taken away by the steel sheet, and hence heating is accelerated as compared with the case where the microwave oscillating device is singly used.

Further, when the microwave oscillating device, the electric resistance heater, and the high frequency induction heater are used together, in a state in which the temperatures of the interior of furnace and the furnace wall are kept high, the bronze powder and steel sheet can be heated most effectively by rapid heating.

In the case where the atmosphere in the furnace is an inert gas atmosphere, when only the electric resistance heater is used, even if the temperature of bronze powder reaches the sintering temperature, since a copper oxide film exists on the surface, sintering is hindered by the oxide film. If the microwave oscillating device is combinedly used, it is thought that the copper oxide film on the surface of bronze powder is heated by microwaves, so that the temperature increases to a temperature such that nearby bronze is melted and sintering occurs, and the copper oxide film itself is melted (the melting point of copper oxide is as low as about 1200° C.), whereby contact between metals occurs.

On the other hand, in the case where the atmosphere in the furnace is a reducing atmosphere, microwave heating of bronze powder occurs during the time when the copper oxide film on the surface is reduced by the reducing atmosphere. Therefore, the sintering speed is lower than in an inert gas atmosphere. However, the bronze powder is heated rapidly by the microwave oscillating device from the time when heating is started to the time when the copper oxide film is reduced, so that it is thought that the sintering speed is higher than in the case of heating by the electric resistance heater only.

Further, if the furnace wall is constructed by refractories, since the refractories are a dielectric substance, they absorb microwaves well, and self heat generation occurs, so that the thermal efficiency in the case where the interior of furnace is kept at a high temperature is high as compared with the case of heat conduction from the electric resistance heater. Further, if the refractories themselves or the surfaces of refractories are formed of a dielectric substance having a high microwave absorbing property, a greater effect can be achieved.

DETAILED DESCRIPTION OF PREFERRED EMBODIMENTS

An embodiment of the present invention will now be described with reference to the accompanying drawings.

Figure 1:
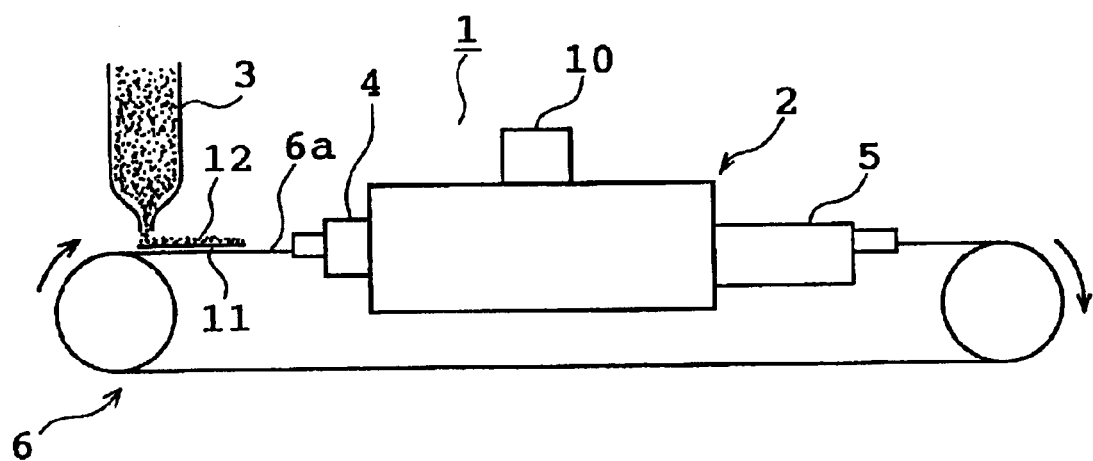
FIG. 1 is a schematic view of a sintering system in accordance with an embodiment of the present invention.
Figure 2:
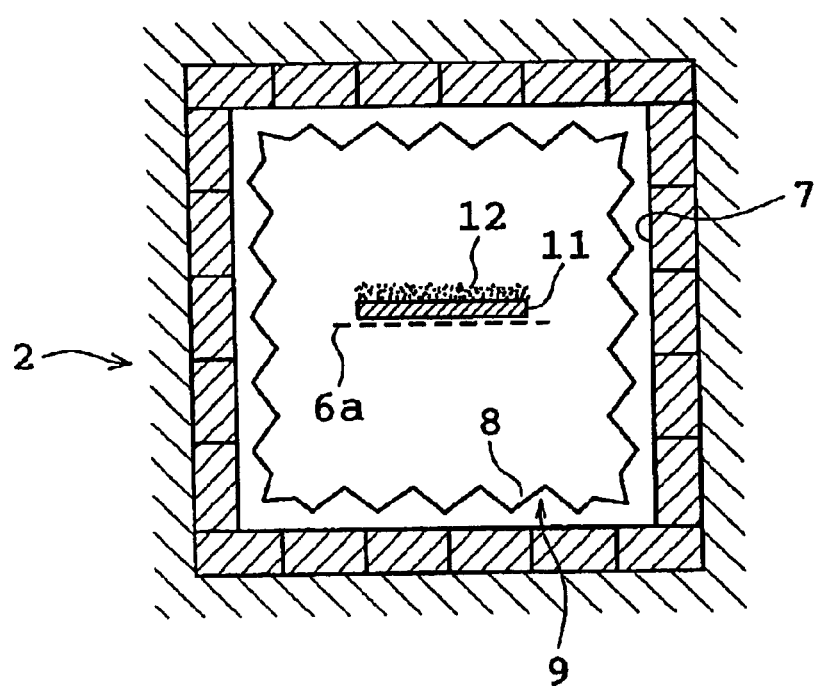
FIG. 2 is a sectional view of a sintering furnace in the system shown in FIG. 1.

FIG. 1 schematically shows the whole of a sintering system. This sintering system 1 is mainly composed of a sintering furnace 2. On the inlet side of this sintering furnace 2, a hopper 3 is provided to scatter copper or copper alloy powder on a steel sheet when a copper-base sintered bearing material with a steel backing metal is produced. Also, a high frequency induction heater 4 is provided on the inlet side of the sintering furnace 2, and a cooling chamber 5 is continuously formed on the outlet side thereof. A material to be sintered is put on a belt 6a of a belt conveyor 6 as a carrier device, and is carried successively to the high frequency induction heater 4, the sintering furnace 2, and the cooling chamber 5. 48 The internal surface of the sintering furnace 2 is lined with refractories 7, which is a dielectric substance as shown in FIG. 2. In the sintering furnace 2, an electric resistance heater wire 8 is provided along a furnace wall constructed by the refractories 7, and this electric resistance heater wire 8 constitutes an electric resistance heater 9. Also, in the upper central portion of the sintering furnace 2, a microwave oscillating device 10 is provided. This microwave oscillating device 10 generates microwaves with a frequency of, for example, 2.45 GHz in the high frequency induction heater 4 and the sintering furnace 2.

The copper-base sintered bearing material with a steel backing metal is produced by using the above-described sintering system 1 in a way as described below. First, a steel sheet 11 is placed on the belt 6a and is conveyed, and copper or copper alloy powder 12 is scattered on the steel sheet 11 by using the hopper 3. Subsequently, the steel sheet 11 on which the powder 12 has been scattered is carried into the high frequency induction heater 4 having a reducing atmosphere or an inert gas atmosphere. The steel sheet 11 having been carried into the high frequency induction heater 4 causes self heat generation by means of induction heating, so that the copper alloy powder 12 is heated by microwaves.

Subsequently, the steel sheet 11 is carried into the sintering furnace 2, and therein is further heated by radiation from the electric resistance heater wire 8 or by a furnace gas heated by the electric resistance heater wire 8. Also, although the copper or copper alloy powder is heated by the electric resistance heater wire 8 in the same way as described above, it is heated mainly by microwaves and is sintered. Then, the steel sheet 11 mounted with a sintered layer is carried into the cooling chamber 5, and therein is cooled, by which it is completed as the copper-base sintered bearing material with a steel backing metal. The copper-base sintered bearing material may subsequently be rolled to densify the sintered layer or may be subjected to sintering and rolling operations repeatedly.

The present inventor conducted an experiment to compare the producing method in accordance with the present invention with the conventional producing method in which the material is heated only by the conventional electric resistance heater.

The material to be sintered was a material in which copper alloy powder (−60 mesh) containing 10 mass % Sn, the balance being Cu, was scattered on a steel sheet 150 mm in width and 1.5 mm in thickness to a thickness of 1 mm.

The conventional sintering furnace using electric resistance heating is divided into four zones. The size of each zone was equal to each other, measuring 160 mm wide by 100 mm high by 750 mm long. The maximum output of the electric resistance heater wire of each zone was set at 20 KW.

The sintering furnace of the present invention is basically the same as the conventional sintering furnace using electric resistance heating, and differs from the conventional sintering furnace in that there is provided a microwave oscillating device consisting of a microwave generator of a frequency of 2.45 GHz and an output of 10 KW. The microwave oscillating device was provided between the second zone and the third zone from the inlet side. The position, frequency, and output of the microwave oscillating device are not limited those described above.

Further, the sintering furnace of the present invention also differs from the conventional sintering furnace in that a high frequency induction heater is provided at the inlet of sintering furnace. The position of the high frequency induction heater is not limited to the inlet. Also, sometimes, the electric resistance heater is not needed.

In the case of this embodiment, heating was performed with a frequency of 10 KHz and an output of 60 KW when the electric resistance heating is applied, and with a frequency of 10 KHz and an output of 30 KW when the electric resistance heating is not applied. The frequency and output are not limited to these values.

Also, as a gas in the sintering furnace, hydrogen gas was used in a reducing atmosphere, and nitrogen gas was used in an inert gas atmosphere.

When the copper alloy powder used in this experiment was sintered by the conventional producing method, the time when a powder layer to be sintered was shrunk by 13% in thickness was taken as the finish of sintering. Therefore, in this experiment as well, the time when the powder layer was shrunk by 13% was taken as the finish of sintering.

The results of this experiment are given in Tables 1 and 2.

As seen from Table 2, according to comparative examples 1 and 2, when sintering was performed with an output of electric resistance heater of 65 KW, sintering was finished by heating for 30 minutes in a reduced atmosphere. However, in an inert gas atmosphere, sintering could not be finished by heating for 30 minutes.

On the other hand, according to the producing method in accordance with the present invention, in embodiment 1, when sintering was performed with an output of microwave oscillating device of 60 KW, sintering finished in 28.5 minutes even in an inert gas atmosphere.

In the comparative examples 1 and 2, about three hours were required as preheating time for making the interior of sintering furnace in a constant temperature state. However, in the embodiment 1, sintering could be finished by starting the sintering operation from the state in which the temperature in the sintering furnace was room temperature.

Also, in the embodiments 2 and 3, when sintering was performed with an output of microwave oscillating device of 10 KW and an output of electric resistance heater of 65 KW, sintering finished in a shorter time than that in the comparative example 1. In embodiment 4, if control was carried out so that sintering finished in the same time as that in comparative example 1 in a reducing atmosphere, only an output of electric resistance heater of 38 KW was needed, and sintering finished with a lower output than that of comparative example 1 even considering the addition of the output of microwave oscillating device of 10 KW.

Also, in embodiments 5 and 6, when sintering was performed with an output of microwave oscillating device of 10 KW and an output of high frequency induction heater of 30 KW, sintering sill finished with a lower output in a shorter time than in comparative example 1.

Also, in embodiments 7 and 8, when sintering was performed with an output of microwave oscillating device of 10 KW, an output of electric resistance heater of 30 KW, and an output of high frequency induction heater of 10 KW, sintering finished in a far shorter time.

TABLE 1

EMBODIMENTS

| NO. | OUTPUT OF ELECTRIC RESISTANCE HEATER KW | OUTPUT OF MICROWAVE OSCILLATING DEVICE KW | OUTPUT OF HIGH FREQUENCY INDUCTION HEATER KW | HEATING TIME min | PERCENTAGE OF SHRINKAGE OF BRONZE SCATTERING THICKNESS % | ATMOSPHERE GAS |
|---|---|---|---|---|---|---|
| 1 | — | 60 | — | 28.5 | 13.0 | N2 |
| 2 | 65 | 10 | — | 19.2 | 13.1 | H2 |
| 3 | 65 | 10 | — | 18 | 13.0 | N2 |
| 4 | 38 | 10 | — | 30 | 12.9 | N2 |
| 5 | — | 10 | 30 | 24.5 | 12.9 | H2 |
| 6 | — | 10 | 30 | 23.2 | 13.1 | N2 |
| 7 | 30 | 10 | 10 | 15.6 | 13.0 | H2 |
| 8 | 30 | 10 | 10 | 14.3 | 13.0 | N2 |

TABLE 2

COMPARATIVE EXAMPLES

| NO. | OUTPUT OF ELECTRIC RESISTANCE HEATER KW | OUTPUT OF MICROWAVE OSCILLATING DEVICE KW | OUTPUT OF HIGH FREQUENCY INDUCTION HEATER KW | HEATING TIME min | PERCENTAGE OF SHRINKAGE OF BRONZE SCATTERING THICKNESS % | ATMOSPHERE GAS |
|---|---|---|---|---|---|---|
| 1 | 65 | — | — | 30 | 13.0 | H2 |
| 2 | 65 | — | — | 30 | 1.5 | N2 |

Thus, according to the producing method in accordance with the present invention, sintering can be performed in a shorter time with a lower output than in the conventional manufacturing method. Further, sintering can be performed in an inert gas atmosphere in which sintering is difficult to perform by the conventional producing method.

The present invention is not limited to the embodiment described above and shown in the drawings, and can be expanded or modified as described below.

Sintering may be performed continuously by scattering copper or copper alloy powder on a steel strip and by causing the steel strip to pass through the sintering furnace continuously.

After sintering has been performed, rolling may be performed to densify the sintered layer.

Sintering and rolling operations may be performed repeatedly.

As described above, according to the present invention, the following effects can be achieved.

In the inventions according to a first aspect, the copper or copper alloy powder can be heated directly by microwaves, so that the thermal efficiency is high.

In the invention according to a second aspect, the copper or copper alloy powder can also be heated by the electric resistance heater and/or the high frequency induction heater, so that sintering can be performed in a shorter time with a lower output.

By using microwave heating, as in the invention according to a third aspect, sintering can be performed in either a reducing atmosphere or an inert gas atmosphere.

What is claimed is:

1. A method of producing a copper-base sintered bearing material with a backing metal in which copper or copper alloy powder is scattered on a steel sheet, and subsequently said copper or copper alloy powder on said steel sheet is sintered by a sintering furnace, wherein a microwave oscillating device is used as heating means provided in said sintering furnace, and said copper or copper alloy powder is heated and sintered by said microwave oscillating device.

2. The method of producing a copper-base sintered bearing material according to claim 1, wherein said sintering furnace is provided with an electric resistance heater and/or a high frequency induction heater as heating means in addition to said microwave oscillating device.

3. The method of producing a copper-base sintered bearing material according to claims 1, wherein the interior of said sintering furnace is in a reducing atmosphere or an inert gas atmosphere.

4. The method of producing a copper-base sintered bearing material according to claims 1, wherein the interior of said sintering furnace is in a reducing atmosphere or an inert gas atmosphere.

* * * * *